(12) United States Patent
Shen et al.

(10) Patent No.: US 8,671,248 B2
(45) Date of Patent: Mar. 11, 2014

(54) ARCHITECTURE SUPPORT OF MEMORY ACCESS COLORING

(75) Inventors: Xiaowei Shen, Hopewell Junction, NY (US); Robert W. Wisniewski, Ossining, NY (US); Orran Krieger, Newton, MA (US)

(73) Assignee: International Business Machines Corporation, Armonk, NY (US)

( * ) Notice: Subject to any disclaimer, the term of this patent is extended or adjusted under 35 U.S.C. 154(b) by 1448 days.

(21) Appl. No.: 11/620,293

(22) Filed: Jan. 5, 2007

(65) Prior Publication Data

US 2008/0168239 A1    Jul. 10, 2008

(51) Int. Cl.
*G06F 12/00* (2006.01)
*G06F 13/00* (2006.01)
*G06F 13/28* (2006.01)

(52) U.S. Cl.
USPC ........... 711/154; 711/118; 711/133; 711/134; 711/141

(58) Field of Classification Search
None
See application file for complete search history.

(56) References Cited

U.S. PATENT DOCUMENTS

| | | | |
|---|---|---|---|
| 5,287,508 A * | 2/1994 | Hejna et al. | 718/102 |
| 5,784,066 A | 7/1998 | Aizikowitz et al. | |
| 5,913,222 A | 6/1999 | Liedtke | |
| 5,963,972 A * | 10/1999 | Calder et al. | 711/129 |
| 5,999,727 A | 12/1999 | Panwar et al. | |
| 6,073,225 A | 6/2000 | James et al. | |
| 6,081,868 A | 6/2000 | Brooks | |
| 6,289,360 B1 * | 9/2001 | Kolodner et al. | 1/1 |
| 6,321,240 B1 | 11/2001 | Chilimbi et al. | |
| 6,330,556 B1 | 12/2001 | Chilimbi et al. | |
| 6,463,582 B1 | 10/2002 | Lethin et al. | |
| 6,477,634 B1 | 11/2002 | Comment | |
| 6,654,859 B2 | 11/2003 | Wooldridge | |
| 7,200,721 B1 | 4/2007 | Lang et al. | |
| 7,395,279 B2 | 7/2008 | Iyengar et al. | |
| 7,434,002 B1 | 10/2008 | Zedlewski et al. | |
| 7,581,064 B1 | 8/2009 | Zedlewski et al. | |
| 7,895,392 B2 | 2/2011 | Shen et al. | |
| 2003/0023816 A1 * | 1/2003 | Kyker et al. | 711/133 |
| 2004/0123038 A1 * | 6/2004 | Shami et al. | 711/132 |
| 2005/0108298 A1 * | 5/2005 | Iyengar et al. | 707/201 |
| 2005/0188157 A1 * | 8/2005 | Kashyap | 711/130 |
| 2007/0157003 A1 * | 7/2007 | Durham et al. | 711/206 |
| 2008/0168237 A1 | 7/2008 | Shen et al. | |

FOREIGN PATENT DOCUMENTS

JP    2000339220 A    12/2000

OTHER PUBLICATIONS

"Evaluating Subject Matter Eligibility Under 35 USC 101", Aug. 2012 Updated, Office of Patent Legal Administration, United States Patent and Trademark Office. http://www.uspto.gov/patents/law/exam/101_training_aug2012.pdf.*

(Continued)

*Primary Examiner* — Yaima Rigol
(74) *Attorney, Agent, or Firm* — Ference & Associates LLC

(57) ABSTRACT

Memory Access Coloring provides architecture support that allows software to classify memory accesses into different congruence classes by specifying a color for each memory access operation. The color information is received and recorded by the underlying system with appropriate granularity. This allows hardware to monitor color-based cache monitoring information and provide such feedback to the software to enable various runtime optimizations. It also enables enforcement of different memory consistency models for memory regions with different colors at the same time.

18 Claims, 2 Drawing Sheets

A Color-based Memory Semantics Implementation

(56) References Cited

OTHER PUBLICATIONS

Mayez A. Al-Mouhamed and Steven S. Seiden, "A heuristic storage for minimizing access time of arbitrary data patterns", IEEE Transactions on Parallel and Distributed Systems, vol. 8, No. 4, pp. 441-447, Apr. 1997.

Min, Rui et al., "Improving Performance of Large Physically Indexed Caches by Decoupling Memory Addresses from Cache Addresses," IEEE Transactions on Computers, Nov. 2011, pp. 1191-1201, vol. 50, No. 11, IEEE Digital Library.

Bugnion, Edouard et al., "Compiler-Directed Page Coloring for Mulitiprocessors," ASPLOS VII, Oct. 1996, pp. 244-255, ACM Digital Library.

Kalamatianos, John et al., "Temporal-based Procedure Reordering for Improved Instruction Cache Performance," Proceedings of 1998 Fourth International Symposium on High-Performance Computer Architecture, Las Vegas, Nevada, USA, Feb. 1-4, 1998, pp. 244-253, IEEEXplore Digital Library.

\* cited by examiner

ASSIGN_COLOR *color, address*
    assigns a color to a memory address so that subsequent memory accesses to that address will have that color.

ASSIGN_COLOR *color, address, size*
    assigns a color to a memory region (defined with a starting address and the size of the region) so that subsequent memory accesses to that address region will have that color.

SET_COLOR *color*
    assigns a color to subsequent memory accesses from the thread.

RESET_COLOR *color*
    assigns a default color to subsequent memory accesses from the thread.

GET_COLOR *register*
    obtains a free color (or a default color if no free color is available) and returns the color in the register.

FREE_COLOR *color*
    instructs the system that a color becomes free.

Figure 1: Exemplary Color Assignment and Management Instructions

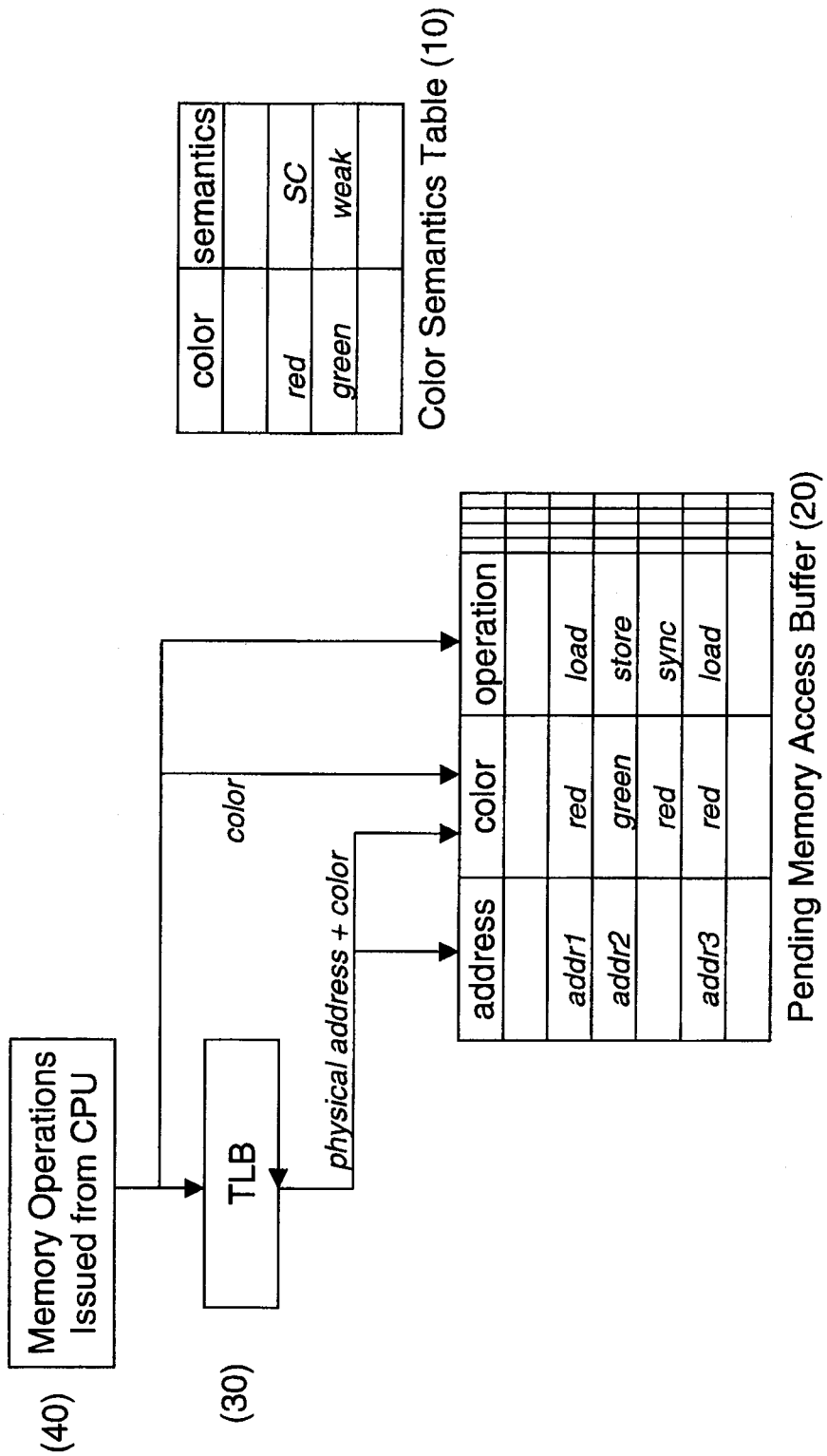
Figure 2: A Color-based Memory Semantics Implementation

ARCHITECTURE SUPPORT OF MEMORY ACCESS COLORING

This invention was made with Government support under Contract No.: NBCHC020056 PERCS I awarded by DARPA. The Government has certain rights in this invention.

FIELD OF THE INVENTION

The present invention relates generally to architecture support that allows software to classify memory accesses to improve performance of memory access operations or allow different memory model semantics for different memory access operations.

BACKGROUND OF THE INVENTION

In modern microprocessors, memory access operations from different applications and the operating system are treated identically at the cache and memory side. When a cache or memory receives a memory access operation, it is usually unable to distinguish which thread (or process) has issued the memory request.

A problematic situation arises with the ability to guarantee correctness of a program. The memory system generally needs to be conservative to ensure correctness of the program. For example, when a memory barrier instruction, such as the PowerPC's SYNC instruction, is executed, it must be guaranteed that all of the previous memory accesses be completed before the memory barrier instruction completes. In fact, it is generally sufficient to guarantee the memory ordering for memory accesses from the same thread (or process). However, valuable information is lost because the memory system cannot distinguish between memory access operations from different threads (or processes).

Another problem affects the accuracy or efficiency of certain hardware prediction mechanisms that may get confused due to memory accesses from irrelevant threads. For example, consider a hardware mechanism to predict streaming data access patterns. When multiple threads are generating independent memory accesses, it would be difficult or expensive for the hardware prediction mechanism to filter "unrelated' memory accesses in order to recognize a streaming pattern generated by one thread (or process).

Further, difficult situations arise when a cache is shared by many threads (or processes). In such a situation, it is very important to be able to monitor cache behaviors for different threads (or processes) in order to efficiently manage those threads (or processes). This can be difficult if there is no way to tell which thread (or process) has issued a memory access request, such as in the memory systems of the prior art.

Thus, there exists a need in the art for a cache and memory system which is able to distinguish between memory operations from distinct threads (or processes). Such a system would ensure a more efficient caching mechanism while increasing the accuracy and efficiency of hardware prediction mechanisms.

SUMMARY OF THE INVENTION

This present invention relates to Memory Access Coloring. Memory Access Coloring provides architecture support that allows software to classify memory accesses into different congruence classes by specifying a color for each memory access. The color information is received and recorded by the underlying system with appropriate granularity. This allows hardware to monitor color-based cache monitoring information and provide such feedback to software to enable various runtime optimizations. It also enables enforcement of different memory consistency models for memory regions with different colors at the same time.

In one aspect, the instant invention provides an apparatus for accessing a memory storage structure in a computer, said apparatus comprising a generator that generates memory access operations in response to software, a receiver that receives and records color information by hardware in the storage structure, an assignor that assigns a color to memory access operations, wherein the hardware is able to distinguish between memory access operations with different colors.

In another aspect, the instant invention provides a method of accessing a storage structure, said method comprising the steps of generating memory access operations in response to software, receiving and recording color information by hardware in the storage structure, assigning a color to memory access operations, wherein the hardware is able to distinguish between memory accesses with different colors.

In a third aspect, the instant invention provides a program storage device readable by machine, tangibly embodying a program of instructions executable by the machine to perform method steps for accessing a storage structure, said method comprising the steps of generating memory access operations in response to software, receiving and recording color information by hardware in the storage structure, assigning a color to memory access operations, wherein the hardware is able to distinguish between memory accesses with different colors.

For a better understanding of the present invention, together with other and further features and advantages thereof, reference is made to the following description, taken in conjunction with the accompanying drawings, and the scope of the invention will be pointed out in the appended claims.

BRIEF DESCRIPTION OF THE DRAWINGS

FIG. 1 shows a group of exemplary color instructions that can be used by software for color assignment and color management.

FIG. 2 shows an exemplary implementation of color-based memory semantics according to the present invention.

DETAILED DESCRIPTION OF THE PREFERRED EMBODIMENTS

As mentioned above, Memory Access Coloring provides architecture support that allows software to classify memory accesses into different congruence classes by specifying a color for each memory access. The color information is received and recorded by the hardware at the cache or memory side. Each memory access operation has a color assigned to it by the software, either implicitly or explicitly. Although these colors may be thought of in an abstract sense as a finite "palette" of colors including "red" and "blue" and so forth, this "palette" of colors is in essence simply a finite amount of distinguishers of sets. For example, a color can be a thread identifier, a process identifier, or a processor identifier. When the identifier, for example, a thread identifier, is used, all memory accesses from the same thread have the same color. Rather than using thread or process identifiers, colors can also be assigned based on memory regions. For example, all memory accesses to a particular memory page can have the same color.

Colors can be assigned in numerous ways. For example, a memory access instruction can explicitly specify color information of the memory access operation. Color information can be provided for a memory load instruction, a memory store instruction, a memory synchronization instruction such as test-and-set and load-reserve/store-conditional, a memory barrier instruction such as PowerPC's SYNC instruction, and so on. Colors may also be provided or associated with various memory models, such as a Sequential Consistency model or a weak memory model.

Colors can also be assigned by executing appropriate color instructions. This provides flexibility to the software by enabling it to assign colors to objects, procedure calls, and so forth, in different ways. FIG. 1 illustrates a partial set of the exemplary color instructions that could represent the color instructions of the present invention. "ASSIGN_COLOR color, address" assigns a color to a memory address so that subsequent memory access operations to that address will have the specified color. "ASSIGN_COLOR color, address, size" assigns a color to a memory address region so that subsequent memory access operations to that memory region will have the specified color. Defined with a starting memory address and the size of the memory region, the memory region is generally a continuous memory range in the virtual address space. "SET_COLOR color" assigns a color to all subsequent memory accesses from the thread (or process) until a SET_COLOR or RESET_COLOR instruction is executed. "RESET_COLOR color" assigns the default color to all subsequent memory accesses from the thread (or process) until a SET_COLOR instruction is executed. "GET_COLOR register" obtains a free color (i.e., a color that is not currently being used) from the system, or returns a default color if there is no free color available. The free color (or the default color) is generally returned in a general register so that it can be used by a subsequent color instruction. "FREE_COLOR color" instructs the system that a color is no longer used and therefore can be freed for future use.

In the color instructions described above, the color information can be provided as an immediate value, or a value maintained in a general register. As with normal memory access instructions, the issue of which addressing modes to support is also an issue with the color instructions that include a memory address or a memory region. There could be as few as a single addressing mode or as many as are supported by the normal memory load and store instructions. The color instructions described above are representative of an instruction set architecture (ISA) extension that could be used to implement the color instructions; however, the color instructions of the present invention are not necessarily limited only to those instructions shown in FIG. 1.

The functions detailed above, with specific reference to the GET_COLOR and FREE_COLOR instructions, enable color management to be handled by the underlying system, so that software does not need to track which colors are currently used and which colors are currently available. In an exemplary implementation, the underlying system maintains a list of free colors. Thus, whenever a color is needed, the system checks the list and provides a free color to software via a general register or an immediate value. If the list of free colors is empty, the system declares that the default color should be used. In essence, the system performs whatever functions are necessary in order to maintain the colors for the functional implementation of the color assignment.

The numerous methods detailed above to assign memory access colors imply that the granularity of the color information is able to be maintained at various levels. For example, the color information can be maintained at cache line granularity. The color information can also be maintained at memory page granularity. Further, the color information can be maintained by a user-specified granularity. There is a tradeoff between flexibility and ease of implementation depending upon the granularity of the color information that is chosen. When the color information is maintained at memory page granularity rather than at cache line granularity, the implementation is generally less expensive; however, flexibility is often decreased.

There are also various places in which the color information can be stored. The information can be stored in a cache, or in a page table or TLB (Translation Look-aside Buffer). For example, if the color information is stored in a cache, it is stored much like cache state information stored in accordance with a cache coherence protocol (such as MESI), where every cache line is associated with dedicated bits for the corresponding state information. The storage of color information generally extends one or more bits for each cache line to show the color of the cache line. The color information can then be retrieved when data is retrieved from the cache line.

If color information is maintained at page granularity (which is generally much larger than cache line granularity), a page table or TLB provides an ideal place to maintain the color information. When a memory access instruction is executed, the corresponding color information can be retrieved from the page table or TLB as the virtual address of the memory access is translated to the corresponding physical address. The retrieved color information can then be passed to the underlying cache or memory controller (or the load/store queue of the processor) for proper use.

The present invention associates a color with each memory access operation. This association can be implemented to allow software to use different colors to distinguish memory access operations of different memory regions, data structures, threads, function calls, and so forth. For example, software can use a dedicated color for an asynchronous thread. The software has the responsibility to assign proper colors to memory access operations using the functions and modes presented above. Through such assignation, multiple memory access streams are effectively presented to the underlying memory system. Thus hardware can treat different memory access operations with different colors as independent transactions unless it is specifically stated to do otherwise.

The color information of memory access operations can be heuristic information; thus, the correctness cannot be compromised if the color information provided by the software is inaccurate. However, the software can also instruct the underlying system that the color information is guaranteed to be accurate, which allows certain aggressive optimizations to be performed. For example, when the execution of a job completes, modified data in a cache can be flushed without writing back to the memory, if the color information can precisely identify the cache lines that contain data that is only needed by the completed job.

In the present invention, memory access operations with different semantics requirements can be implemented with different memory model semantics. From a software perspective, memory access operations may be generated by different processes or threads, and thus may need to access different memory regions. Further, certain memory operations may be dependent upon the completion of others, such as the SYNC operation mentioned above. This dependence may occur in the sense that one operation may not be performed until others are performed. With respect to the example of a SYNC instruction, memory access coloring enables the system to guarantee that all previous load and store operations with the same color are completed before the SYNC instruction is completed.

To ensure efficient implementation of color-based memory barriers, it is generally sufficient to maintain the color information at the address translation level (e.g. in the page table or TLB), and provide the color information to the load/store queue of the processor when a memory access instruction is executed. In the case that a memory access instruction explicitly carries color information, this color information can be passed to the load/store queue. This allows a color-based memory barrier to be completed (so that subsequent memory access operations can be executed) once all preceding memory access operations with the same color are completed.

The present invention enables the enforcement of different memory consistency semantics for different colors at the same time. For example, the system can ensure the Sequential Consistency (SC) semantics for an operating system thread, while providing some weaker memory semantics (such as PowerPC's weak memory model) for an application thread. This can be achieved if different colors are used for the operating system and the application. In another example, the system can guarantee that all load and store operations are performed in order for a memory region, while allowing load operations to overtake store operations for a different memory region. This can be achieved if different colors are used for memory accesses to the two memory regions.

FIG. 2 shows an exemplary implementation of color-based memory semantics, which allows different memory semantics to be enforced for memory regions with different colors. The system maintains a Color Semantics Table (item 10) that indicates, for each color, what memory semantics should be supported. For example, memory accesses with the red color should support Sequential Consistency (SC), while memory accesses with the green color should support some pre-defined weak memory model. The system further maintains a Pending Memory Access Buffer (20) that comprises, for each pending memory operation, the address, the color, the operation information. The operation information indicates whether the pending memory operation is a load operation, a store operation, a memory synchronization operation, or a memory barrier operation.

In the exemplary implementation, the system maintains color information in the TLB (30) and the page table. The color information is maintained at the page granularity. It should be appreciated that the color information can also be maintained at the sub-page granularity if multiple colors can be maintained for each TLB and page table entry. When a memory operation (40) is issued, the corresponding color information is retrieved from the TLB (30) and stored in the Pending Memory Access Buffer (20). A memory instruction (for example, a memory barrier instruction) may also explicitly carry color information that is directly passed to the Memory Access Buffer.

For a memory load or store operation, the system uses the color information to determine whether the memory load or store operation can be executed, according to the semantics associated with the corresponding color. For a memory barrier operation, the system uses the color information to determine when the memory barrier operation can be completed, by only checking preceding memory operations with the same color.

The system can have more than one predefined memory models. For example, the system may have a predefined Sequential Consistency (SC) model, and a predefined weak memory model that allows memory accesses to be reordered provided that local data dependencies are respected (e.g. the weak memory model specified by the PowerPC architecture). The system may also have a predefined memory model that allows load operations to overtake pending store operations provided that local data dependencies are respected (e.g. the Total Store Order memory model specified by the Sparc architecture).

To associate colors with memory models, the system can provide explicit color-semantics associate instructions that allow software to explicitly associate a color with a memory model. For example, "ASSOCIATE_COLOR color, memory-model-number" associates a color to the memory semantics represented by the corresponding memory model number. It should be pointed out that, rather than explicitly associating color and memory semantics, the system may implicitly assume that a particular color is always associated with a particular memory model, so that software should use that particular color to achieve the desired semantics of the particular memory model.

If not otherwise stated herein, it is to be assumed that all patents, patent applications, patent publications and other publications mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
one or more memory storage structures;
an operating system running on the apparatus;
one or more software programs running on the apparatus;
a generator that generates memory access operations in response to the operating system or the one or more software programs;
an assignor that assigns color information to memory access operations based on color designations specified by the operating system or the one or more software programs, wherein the color information comprises a thread identifier, a process identifier, or a processor identifier;
wherein the color information serves as a basis for monitoring and for providing feedback which enables runtime optimizations; and
a receiver that receives and records memory access color information in the one or more storage structures;
wherein apparatus hardware is configured to distinguish between memory access operations with different colors and monitor memory access operations and enforcement of memory utilization based on color information; and
wherein the assignor assigns a color based on the execution of one or more color instructions which comprise an ASSIGN COLOR color instruction configured to accept color and address parameters, and the ASSIGN COLOR color instruction assigns a designated color specified by the color parameter to a designated address specified by the address parameter so that subsequent memory access operations to the designated address are assigned the designated color, until a SET COLOR instruction or RESET COLOR instruction is executed to assign a color to all subsequent memory accesses.

2. The apparatus according to claim 1, wherein the assignor assigns colors based on at least one of the following: memory regions, data structures, function calls, threads, processes, and processors.

3. The apparatus according to claim 1, further comprising:
a maintainer that maintains a list of free colors that can be assigned, a provider which provides a free color for assignation to a memory access operation, and a default color which is utilized by the provider when no other colors are available for assignation.

4. The apparatus according to claim 1, wherein the color information is maintained at one of the following levels: cache line granularity, memory page granularity, and user-specified granularity.

5. The apparatus according to claim 1, wherein a memory barrier operation with a given color is completed once all preceding memory operations with the same given color are completed.

6. The apparatus according to claim 1, further comprising:
wherein different memory consistency semantics are enforced for memory access operations with different colors.

7. The apparatus according to claim 6, wherein memory consistency semantics are enforced such that memory access operations generated by the one or more operating systems are provided stronger memory consistency semantics while memory access operations generated by the one or more software programs are provided weaker memory consistency semantics.

8. The apparatus according to Claim 1, further comprising:
one or more memory models, wherein color information is associated with the one or more memory models based on the execution of one or more color instructions;
wherein memory accesses are reordered or load operations overtake pending store operations based on the one or more memory models.

9. The apparatus according to Claim 1, wherein the one or more color instructions are also comprised of at least one of: GET_COLOR and FREE_COLOR.

10. A method comprising:
generating memory access operations in response to one or more software programs or an operating system running on an apparatus;
assigning color information to memory access operations based on color designations specified by the operating system or the one or more software programs, wherein the color information comprises a thread identifier, a process identifier, or a processor identifier;
wherein the color information serves as a basis for monitoring and for providing feedback which enables runtime optimizations;
receiving and recording memory access color information in one or more storage structures; and
distinguishing between memory access operations with different colors and monitoring of memory access operations and enforcement of memory utilization based on color information;
wherein said assigning comprises assigning a color based on the execution of one or more color instructions which comprise an ASSIGN COLOR color instruction configured to accept color and address parameters, and the ASSIGN COLOR color instruction assigns a designated color specified by the color parameter to a designated address specified by the address parameter so that subsequent memory access operations to the designated address are assigned the designated color, until a SET COLOR instruction or RESET COLOR instruction is executed to assign a color to all subsequent memory accesses.

11. The method according to claim 10, wherein the step of assigning a color assigns colors based on at least one of the following: memory regions, data structures, function calls, threads, processes, and processors.

12. The method according to claim 10, wherein the step of assigning a color assigns a color based on the execution of one or more color instructions.

13. The method according to claim 12, further comprising the step of:
associating color information with one or more memory models based on the execution of one or more color instructions;
wherein memory accesses are reordered or load operations overtake pending store operations based on the one or more memory models.

14. The method according to claim 10, wherein the color information is maintained at one of the following levels: cache line granularity, memory page granularity, and user-specified granularity.

15. The method according to claim 10, wherein a memory barrier operation with a given color is completed once all preceding memory operations with the same given color are completed.

16. The method according to claim 10, further comprising the step of:
providing one or more memory consistency semantics;
wherein different memory consistency semantics are enforced for memory access operations with different colors.

17. The method according to claim 16, wherein memory consistency semantics are enforced such that memory access operations generated by the one or more operating systems are provided stronger memory consistency semantics while memory access operations generated by the one or more software programs are provided weaker memory consistency semantics.

18. A non-transitory program storage device readable by machine, tangibly embodying a program of instructions executable by the machine to perform steps for accessing a storage structure, said steps comprising:
generating memory access operations in response to one or more software programs or an operating system running on an apparatus;
assigning color information to memory access operations based on color designations specified by the operating system or the one or more software programs, wherein the color information comprises a thread identifier, a process identifier, or a processor identifier;
wherein the color information serves as a basis for monitoring and for providing feedback which enables runtime optimizations;
receiving and recording memory access color information in one or more storage structures; and
distinguishing between memory access operations with different colors and monitoring of memory access operations and enforcement of memory utilization based on color information;
wherein said assigning comprises assigning a color based on the execution of one or more color instructions which comprise an ASSIGN COLOR color instruction configured to accept color and address parameters, and the ASSIGN COLOR color instruction assigns a designated color specified by the color parameter to a designated address specified by the address parameter so that subsequent memory access operations to the designated address are assigned the designated color, until a SET COLOR instruction or RESET COLOR instruction is executed to assign a color to all subsequent memory accesses.

* * * * *